United States Patent [19]

Bachmann

[11] 3,848,289

[45] Nov. 19, 1974

[54] SCRAPER BLADE

[75] Inventor: Thomas H. Bachmann, New Albany, Ind.

[73] Assignee: Chemetron Corporation, Chicago, Ill.

[22] Filed: Apr. 16, 1973

[21] Appl. No.: 351,456

[52] U.S. Cl............. 15/246.5, 15/104.1 C, 62/354
[51] Int. Cl............................................. F28g 3/12
[58] Field of Search.......... 15/246.5, 93 R, 104.1 C; 259/DIG. 34, DIG. 32, DIG. 1, 106, 107, 109, 111, 182, 8; 62/354; 432/151; 23/285, 252 A; 260/79

[56] References Cited
UNITED STATES PATENTS

| | | | |
|---|---|---|---|
| 2,711,552 | 6/1955 | Lengyel | 15/236 R |
| 3,395,419 | 8/1968 | Nunlist et al. | 15/246.5 |
| 3,728,313 | 4/1973 | Hill, Jr. et al. | 260/79 |
| 3,731,339 | 5/1973 | Addison | 15/246.5 |
| 3,737,411 | 6/1973 | Scoggins | 260/79 |

FOREIGN PATENTS OR APPLICATIONS 1,183,901  2/1959  France............................. 259/109

Primary Examiner—Harvey C. Hornsby
Assistant Examiner—Chris K. Moore
Attorney, Agent, or Firm—Mason, Kolehmainen, Rathburn & Wyss

[57] ABSTRACT

A scraper blade is made from polyphenylene sulfide (PPS) and uniformly filled with a reinforcing filler such as short glass fibers. The blade has a scraping edge of substantially 90° included angle and both front and back surfaces of the blade can be provided with such perpendicular edges. The blade can be turned so that all four scraping edges can be utilized.

6 Claims, 6 Drawing Figures

PATENTED NOV 19 1974

3,848,289

3,848,289

SCRAPER BLADE

This invention relates to an improved scraper blade for scraped-surface heat exchangers, agitating apparatus, and the like. More particularly, this invention relates to a scraper blade made from polyphenylene sulfide filled with reinforcing filler and having at least one substantially perpendicular scraping edge.

A scraped-surface heat exchanger of the type to which this invention pertains, employs an agitator, such as a scraper blade, that sweeps practically the entire lateral wall of the heat exchanger vessel. The blade defines an acute angle with respect to a tangent drawn at its point of contact with the lateral wall of the heat exchange vessel.

Such scraped-surface equipment employ a myriad of agitator or blade configurations. In such equipment, the agitators are forced toward the lateral wall of the vessel, as by springs, centrifugal action, hydrodynamic action of the fluid on the agitator, and/or by friction between the agitator tip and the vessel wall.

BACKGROUND OF THE INVENTION

One particular type of scraped-surface heat exchanger is manufactured and sold by Chemetron Corporation under the trademark VOTATOR and has plural floating blade agitators which are forced against the lateral wall of the vessel by centrifugal action and by the hydrodynamic action of the fluid on the agitator. The blades are pivotally attached to a central shaft so that the scraper blades can contact the inner wall on the tube or vessel at different angles relative to the wall tangent at the point of contact. With pivotally attached blades, the shaft can be eccentrically disposed with respect to the center of the vessel or the vessel can be generally elliptical in cross-section so that during shaft rotation the scraper blades exert a radial pumping action on the fluid being processed.

Such scraped-surface heat exchanger with floating scraper blades are extensively used in the food processing, chemical, and petroleum industries. Another type of such equipment has scraper blades which are biased against the wall by springs. Typical applications for spring biased blades are processing of heavy waves and crystallizing solution.

PRIOR ART

The scraper blades commonly used in scraped-surface heat exchangers are made of metal, polymer laminates having woven or nonwoven reinforcement, or molded acetal resins. Such blades have beveled edges with acute included angles.

The beveled edge scrapes the film from the cylinder wall. A critical factor in the performance of three blades of the prior art is the angle given the beveled edges. If the beveled edges are not kept sharpened, various production problems will result (see an article by Charles H. Bagans, "A Production Man's Guide to Trouble Shooting," *Dairy and Ice Cream Field*, Nov., 1969). The portion of the blade which contacts the cylinder wall wears into a heel. The included beveled edge angle on such prior art blades generally has varied from 15° to 80° and typically has been 60°.

Although metal blades have strength, toughness and hardness required for rigorous scraping, a major disadvantage of metal blades is their tendency to gall, shave or spall the cylinder surfaces when processing poorly lubricating fluids. There have been attempts to find a polymeric material which overcomes the above-mentioned deficiencies of metal blades while possessing the required rigidity and hardness without brittleness. The polymeric blade must also have good abrasion resistance, good dimensional stability, resistance to a broad range of solvents, mineral and organic acids and alkalis, and resistance over a wise range of operating temperatures.

Attempts to develop such a polymeric blade have been only partially successful since the polymeric blades used in the prior art typically have short useful lives and lack chemical or temperature resistance. Such blades have been made with a scraping edge included angle generally of 30°–80°, and typically 60°, relative to the adjacent side of the blade.

One polymeric material which has been used for more than ten years in the manufacture of such blades is an acetal resin commercially available under the trademark DELRIN. Another polymer which has been used for scraper blades is commercially available under the trademark CELCON. Both of these materials have been molded into unreinforced scraper blades having a scraping edge included angle generally of 45°–80° but have been limited to operating temperatures below about 180°F and are not resistant to certain chemicals which are commonly processed in scraped-surface heat exchangers.

These prior art polymeric blades have also been manufactured with one or more reinforcing sheets of textile materials bonded therein for the purpose of strength. Such blades have been made by laminating a number of layers of a thin sheet of textile-reinforced polymeric materials. When such laminated blades are used for scraping extremely viscous films at a rate requiring one or more horsepower per linear foot of scraping edge, a number of problems result.

The laminated blades experience delamination, blistering, flaking, chipping, or spalling at the scraping edge. These failures have been attributed to concentrated hydraulic pressure conforming to Pascal's law with equal unit force in all directions as a small volume of viscous fluid at the edge is forced to move and change direction. These results are entirely unexpected in the light of the bond strength of the laminates. For example, the bond strength of typical epoxy-fiberglass laminates are among the highest available yet it has been demonstrated that these laminates delaminate quite easily under vigorous scraping applications. Blistering also is a very pronounced problem with these laminated blades. The blistering phenomenon seems to be a result of moisture or chemicals being absorbed by the blade during temperature and pressure changes which occur during processing.

FIELD OF THE INVENTION

It has been found that polyphenylene sulfide ("PPS"), when uniformly blended with 25–50 percent by weight reinforcing filler and when molded into a blade having a scraping edge of approximately 90° included angle, meets desirable criteria for scraper blades of the type described above. Polyphenylene sulfide is commercially available from Phillips Petroleum Company. A process for its manufacture is set forth in U.S. Pat. No. 3,354,129.

A preferable reinforcing filter is glass fiber of one-fourth inch or less in length. Asbestos, mica, or polytetrafluroethylene fillers possibly can be used. Another possible reinforcing filler is a very small diameter (0.10 to 0.16 micron) fiber of potassium titanate crystals having a length of about 4 to 4.6 microns. The latter fibers are commercially available under the trademark FYBEX. The reinforcing filler can be homogenously mixed with molten polyphenylene sulfide and to form a mixture to be molded to the desired blade dimensions.

The aforesaid mixture can be molded as for example is shown in U.S. Pat. No. 3,354,129. The molding should be carried out above the melting point, or softening point, but below the decomposition point of the polyphenylene sulfide. Suitable molding techniques include injection molding, compression molding, vacuum forming, extrusion, and the like. As described in U.S. Pat. No. 3,354,129, these polymers can be subjected to heat treatment prior to molding or can be heat-treated below the softening point after molding.

It was found that a heat-exchanger blade made from glass-filled polyphenylene sulfide with a scraping edge having an included angle of 45° to 60° did not function satisfactorily due to chipping and flaking of the blade during processing. The result was a very inefficient film scraping and therefore an inefficient heat transfer. The product also was contaminated with polyphenylene sulfide chips and flakes. When the cylinder wall contacting edge of the glass fiber reinforced polyphenylene sulfide blade was made approximately 90° to the adjacent side of the blade, such chipping substantially was eliminated over a wide range of operating conditions. Further, such scraping blade edge was found to scrape a film of processing fluid efficiently from the cylinder wall and to possess favorable physical properties.

The approximately 90° included angle was found to have the following advantages over the acute included angle of prior-art scraped-surface heat exchanger blades: 1) The approximately 90° included angle absorbs greater shear forces with a larger base cross-sectional area at the portion of the blade subjected to shear stresses. 2) The approximately 90° edge confines the major edge stresses to compressive instead of tensile stresses. 3) Plural edges of approximately 90° included angle can be provided on one blade such that when the wear heel develops on one edge to an extent significantly reducing heat transfer, the blade may be removed and reinstalled to use another edge. 4) The reinforced PPS blade material ordinarily is not deteriorated by shrinkage, swelling, warpage, delamination, surface roughness, surface blistering, or excessive pin indentation before excess edge wear has taken place.

BRIEF DESCRIPTION OF THE DRAWINGS

These and other objects of the present invention will be apparent from the following detailed description and the drawing in which like elements have like reference numerals and in which.

DETAILED DESCRIPTION OF PREFERRED EMBODIMENTS

Figure 1:
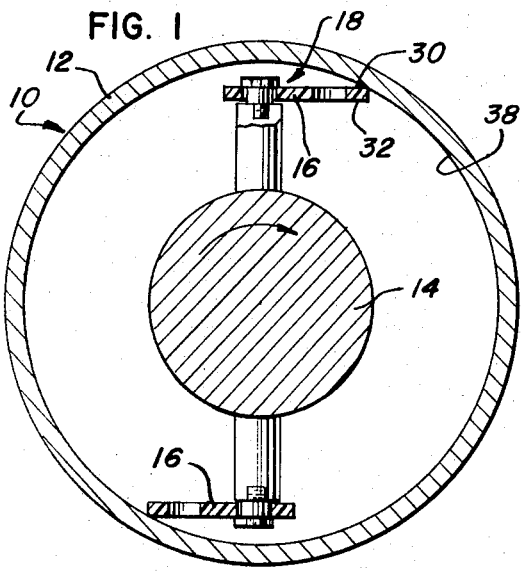
FIG. 1 is a cross-sectional view of a scraped-surface heat exchanger in which filled polyphenylene blades are attached by threaded pins to a rotor.
Figure 2:
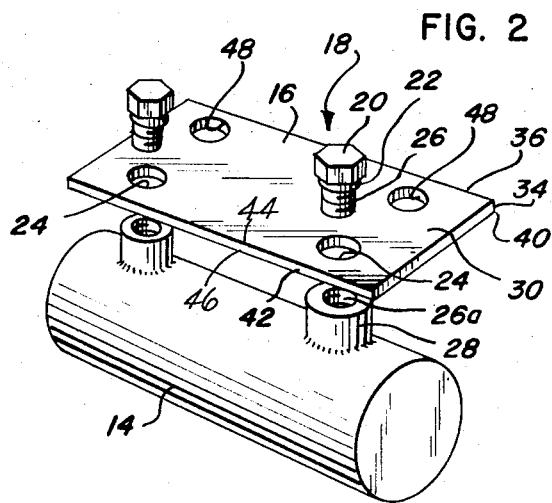
FIG. 2 is an exploded perspective view showing how each blade is attached to the rotor in the scraped-surface heat exchanger of FIG. 1.

FIGS. 1 and 2 illustrate a scraped-surface heat exchanger 10 of the type described above. The heat exchanger 10 comprises a heat exchanger vessel 12 essentially circular in cross-section, the vessel 12 may be surrounded by a heat exchanger jacket of known design. A rotor 14 is disposed concentrically within the vessel 12. A plurality of scraper blades 16 embodying this invention are attached to the rotor 14 by threaded pins 18 of known design. Each pin 18 has an enlarged hexagonal head 20, which facilitates its installation and removal, and an unthreaded shank portion 22, which is slightly longer than the thickness of the associated scraper blade 16 and extends through an oversized opening 24 in such blade to attach such blade loosely to the rotor 14, and a threaded portion 26. Each pin 18 is threaded into a suitably threaded socket 26a in a radial arm 28, which is brazed, or otherwise suitably mounted, to the rotor 14.

Each blade 16 is made of polyphenylene sulfide substantially uniformly filled with approximately 40 percent (by weight) of reinforcing filler, preferably glass fibers, and has generally rectangular parallel faces 30 and 32 (FIG. 1) with a surface 34 therebetween to form an edge 36 in scraping contact with the inner wall surface 38 of the vessel 12. During the operation of the heat exchanger 10, as shown the edge 36 is forced against the surface 38 by a combination of centrifugal action, hydrodynamic action of fluid materials being processed, and frictional forces between the edge 36 and the surface 38. The scraping edge 36 has a substantially 90° included angle formed by the face 30 and the surface 34.

The face 32 and the surface 34 also form another substantially perpendicular edge 40 useful as a scraping edge. Each blade 16 may be removed, repositioned, and reinstalled to use the edge 40 as a scraping edge after the edge 36 has worn excessively. The faces 30 and 32 and a surface 42, which is opposite the surface 34, form additional substantially perpendicular edges 44 and 46 similarly useful as scraping edges. Each blade 16 is provided with additional suitably positioned openings 48, which are similar to the openings 24, to permit the blade 16 to be removed, repositioned, and reinstalled to use either the edge 44 or the edge 46 as a scraping edge in analogous manner.

Figure 3:
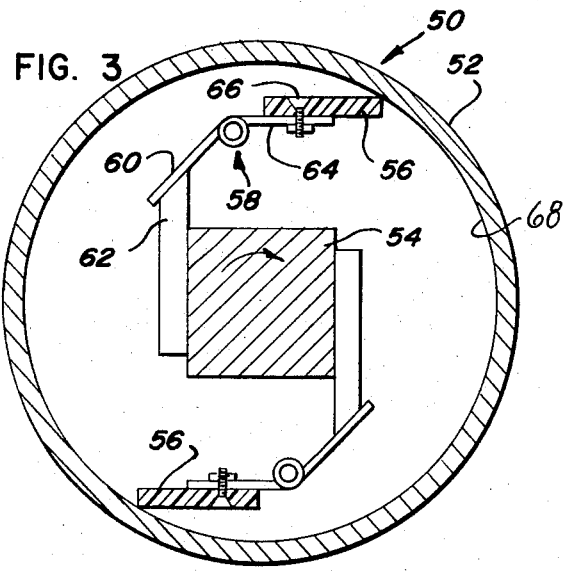
FIG. 3 is a cross-sectional view of another scraped-surface heat exchanger in which filled polyphenylene blades are attached by spring-biased hinges to a rotor.

FIG. 3 illustrates another scraped-surface heat exchange 50 of the type described above. The heat exchanger 50 comprises a heat exchange vessel 52 essentially circular in cross-section. The vessel 12 may be surrounded by a heat exchange jacket (not shown) of known design. A rotor 54, which is essentially square in cross-section, is disposed concentrically within the vessel 52. A plurality of scraper blades 56 embodying this invention are attached to the rotor 54 by spring-biased leaf hinges 58. One half 60 of each hinge 58 is mounted fixedly to an intermediate supporting arm 62 mounted fixedly to the rotor 54. Another leaf 64 of each hinge 58 is mounted, as by a plurality of machine bolts 66, to the associated scraper blade 56. Each hinge 58 is biased, as by a spring (not shown), to urge the associated scraper blade 56 into scraping contact with the inner wall surface 68 of the vessel 52.

In other respects, the blades 56 generally are similar to the blades 16 of FIG. 1. Each blade 56 similarly is made of substantially uniformly filled polyphenylene sulfide. Four edges of each blade 56 are useful as scraping edges of substantially 90° included angle. As described above, suitable provision may be made for each blade 56 to be removed, repositioned, and reinstalled to use each such edge.

Figure 4:
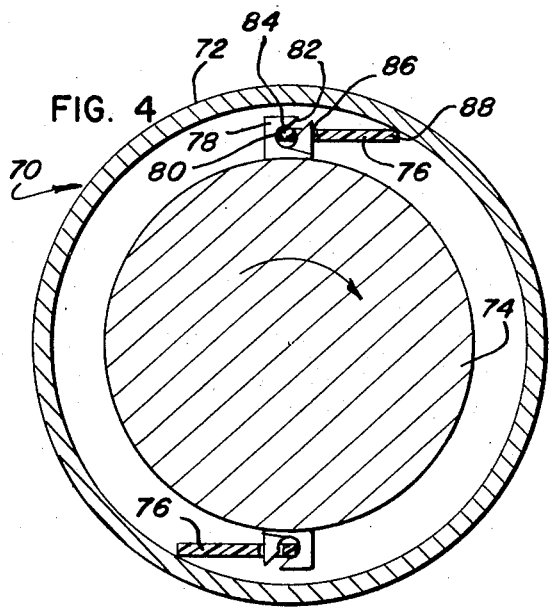
FIG. 4 is a cross-sectional view of another scraped-surface heat exchanger in which filled polyphenylene blades are attached by pivot posts to a rotor.

FIG. 4 illustrates another scraped-surface heat exchanger 70 of the type described above. The heat exchanger 70 comprises a heat exchange vessel 72 essentially circular in cross-section. The vessel 72 may be surrounded by a heat exchange jacket (not shown) of known design. A rotor 74 is disposed concentrically within the vessel 72. A plurality of scraper blades 76 embodying this invention are attached to the rotor 74 respectively by a plurality of axially spaced pivot posts 78 of known design. Each post 78 is brazed, or otherwise suitably mounted, to the rotor 74 and is provided with a bore 80 extending axially of the rotor 74. The bore 80 communicates with a slot 82 extending radially from the bore 80 as shown. Each blade 76 has a trailing edge portion 84, which can be inserted through the slots 82 into the bores 82 of the associated pivot posts 78 with the rotor 74 removed from the vessel 12, and suitable slots 86, through which respective portions of the associated pivot posts 78 extend to prevent accidental disassociation of the blade 76 and the associated pivot posts 78. The respective pivot posts 78 permit the blades 76 to pivot during the operation of the heat exchanger 70.

In other respects, the blades 76 generally are similar to the blades 16 of FIG. 1. Each blade 76 similarly is made of substantially uniformly filled polyphenylene sulfide. Two edges, at the leading edge portion 88, are useful as scraping edges of substantially 90° included angle, the edges at the trailing edge portion 84 being subject to frictional wearing. With the rotor 74 removed from the vessel 72, each blade 76 readily can be removed, repositioned, and reinstalled to use each edge at the leading edge portion 88.

Figure 5:
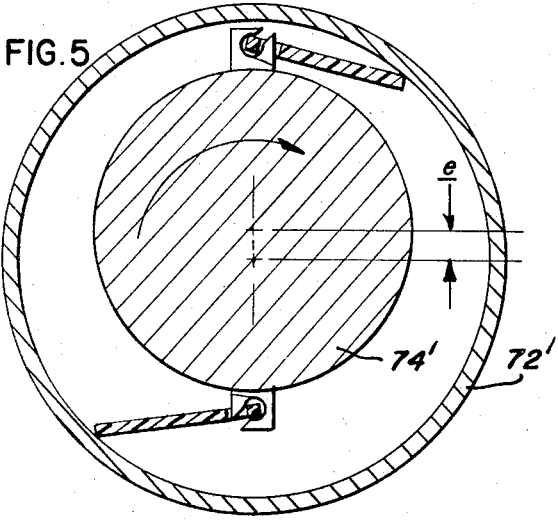
FIG. 5 is a cross-sectional view of a modification of the scraped surface heat exchanger of FIG. 4 wherein the rotor is disposed eccentrically within a heat exchanger vessel of essentially circular cross-section.
Figure 6:
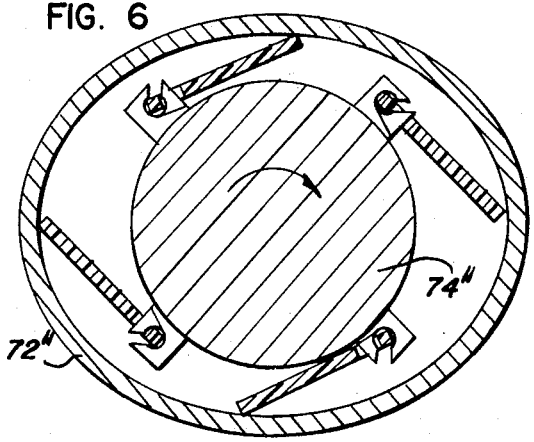
FIG. 6 is a cross-sectional view of another modification of the scraped-surface heat exchanger of FIG. 4 wherein the heat exchanger vessel is essentially elliptical in cross section.

In FIGS. 5 and 6, primed reference numerals are used to indicate certain features similar to like-numbered features in FIG. 4. In the modification of FIG. 5, the rotor 74' is disposed eccentrically within the vessel 72'. Thus, the respective central axes of the rotor 74' and the vessel 72' are displaced by the eccentricity indicated at e. In the modification of FIG. 6, the central axis of the rotor 74'' coincides with the intersection of major and minor diameters of the vessel 72'', which is essentially elliptical in cross-section. As is known, either modification effects a radial pumping action on fluid materials being processed.

EXAMPLES

The following examples are intended to more precisely and specifically describe the unexpected and desirable qualities of the filled PPS blades of the present invention in comparison to prior-art polymeric blades. The jacketed heat-exchange cylinder employed in all examples had a 6 inches I.D. and was 24 inches long. The blades used in examples 1–26 each had a scraping edge included angle of 60°. In examples 1–26 a water-based product was used which simulated the sterilization of food. Tangential force was computed from horsepower loadings, r.p.m. and cylinder circumference. Food processing is a preferred use for the polymeric blades:

EXAMPLES 1–5

Twenty percent aqueous corn starch was recycled through the heat-exchange cylinder, heating the product with 350°F steam. The starch was cooled by a 3 × 12 inches scraped-surface unit to prevent flashing of moisture prior to recycling. Eight 6⅛ inches blades having a scraping edge include angle of 60° were used for 55 minutes at an average product temperature of 322°F. The shaft was run to attain 2,050 watts gross power on the blades, e.g., 0.6 net horsepower per linear foot of scraping edge or 27 pounds of tangential force per linear foot. The following results were obtained on the blades listed in Table I:

Table I — Examples 1–5

| Surface Conditions | | Blade and Scraping | |
|---|---|---|---|
| Example | Material | Heel Width (in.) | Remarks |
| 1 | Polyphenylene Oxide | .030–.075 | very badly warped between pins |
| 2 | Glass Filled Polysulfone (Sulfasar J-1500/20) | .020–.045 | heel rough |
| 3 | Laminated Polyamide (Nomex) | .025–.075 | straight, smooth, some chipping |
| 4 | Polyamide 40% Short Glass Fiber Filled | .006–.025 | some chipping and flaking |
| 5 | Polyamide 40% Long Glass Fiber | .006–.020 | some chipping and flaking |

EXAMPLES 6–9

Twenty percent aqueous corn starch was again recycled through the heat-exchange cylinder, heating the product with 350° F steam to about 325° F the same as in examples 1–5 above. The starch was cooled by a 3 × 12 inches scraped-surface unit to prevent flashing of moisture prior to recycling the same as in examples 1–5. Again eight 6⅛ inches blades were used having a scraping corner edge included angle of 60°. The blades were run for 6 hours and 55 minutes. The horsepower loading was reduced to 0.4 horsepower per linear foot of edge or 20 pounds of tangential force per linear foot. The results obtained on the blades listed are seen in Table II:

Table II — Examples 6–9

| Example | Blade Material | Heel width (in.) | Remarks |
|---|---|---|---|
| 6 | Asbestos-filled phenol formaldehyde (Rogers RX 352) | .030 ragged | crumbly edge |
| 7 | Carbon (Graphitar 92) | .010–.015 | very good |
| 8 | Polyamide 40% Long Glass Fiber | .000–.012 | heavy end wear, cracked at pin |
| 9 | Polytetrafluoroethylene | .004–.015 | slight mushroomed scraping edge |

Although the carbon blade of Example 7 worked quite well and the PTFE blade of Example 9 was fairly good, those examples were under low horsepower loads and for periods of time which would not be feasible in actual production. In all examples that follow, the horsepower was increased to increase the edge loading on the blades.

EXAMPLES 10–15

Thirty-four percent aqueous starch was used as the product. The product was heated with 350° F steam to an average temperature of 242° F and cooled by a 3 × 12 inches scraped-surface unit to prevent flashing of moisture as in previous examples. The horsepower was increased to 0.7 h.p. per linear foot of blade edge or 19 pounds of tangential force per linear foot. Eight 6⅛ inches blades were used having a scraping edge included angle of 60°. The following results were obtained on the blades listed in Table III:

Table III — Examples 10–15

| Example Scraping Time Hrs.:mins. | Blade Material | Heel Width (in.) | Remarks |
|---|---|---|---|
| 10 (4:10) | N.E.M.A. "C" Phenol-Formaldehyde | .010–.020 | straight, rigid, very small blisters |
| 11 (4:10) | Phenol-Formaldehyde Laminated Asbestos Fabric (Synthane AA-HT) | 0.15 | straight, rigid, slight roughened texture |
| 12 (3:10) | Phenol-Formaldehyde Laminated Cotton Fabric | .010–.015 | no blisters, very badly warped, rough |
| 13 (3:10) | Aromatic Polyamide Tetrafluoroethylene Filled | .010–.015 | slight warpage of edge near shaft |
| 14 (3:10) | Polyaryl Sulfone (Astral 360) | — | blade broke in half |
| 15 (3:10) | Polychlorotrifluoroethylene-Glass-Filled (KEL-F KF 6066) | .010–.015 | bad warpage, .210″ thick wire edge |

EXAMPLES 16–20

In these examples, as listed below, blades were tested at different working times. The product was the same as that in Examples 10–15 (34 percent starch) and was heated again with 350° F steam to an average temperature of 340° F. The product was cooled to prevent flashing of moisture as in previous examples. Again eight 6⅛ inches blades were used having a scraping edge included angle of 60°. The horsepower loading was 0.8 h.p. per linear foot of blade edge or 22 pounds of tangential force per linear foot of blade edge. The results obtained on the blades listed are seen in Table IV:

Table IV — Examples 16–20

| Example Scraping Time Hrs.:mins. | Blade Material | Heel width (in.) | Remarks |
|---|---|---|---|
| 16 (14:35) | Phenol-Formaldehyde Laminated Asbestos Matte (N.E.M.A. AAA) | .010–.015 | a few small edge blisters |
| 17 (10:25) | Tetrafluoroethylene with a stainless steel core | .001–.010 | pin was indented by blade |
| 18 (13:35) | Aromatic Polyamide | 1/32 | very badly warped between pins |
| 19 (10:25) | Polyphenylene Sulfide-40% Short Glass Fiber-Filled (Ryton R-4) | .015–.020 | slight blistering, slight edge distortion |
| 20 (10:25) | Poly (Ethylene Terephthalate) 35% Intermediate Glass Fiber-Filled (Petfil J-1800/35) | — | very badly crumbled, pieces missing |

As can be seen from Example 19, the polyphenylene sulfide glass-filled blade molded at a scraping edge included angle of 60° showed failures as did the other 60° polymeric blades tested. These failures resulted from a load of only 0.8 horsepower per linear foot of blade edge when used for short periods of time.

EXAMPLES 21–26

Again various blades, as listed below, were tested at different working times. The product was 34 percent starch as in Examples 10–20. The product was heated with 350° F steam to an average temperature of 338° F. Eight 6⅛ inches blades were used having a scraping edge included angle of 60°. The horsepower loading was 0.8 horsepower per linear foot of blade edge or 22 pounds of tangential force per linear foot. The results obtained are seen in Table V:

Table V — Examples 21–26

| Example Scraping Time Hrs.:mins. | Blade Material | Heel width (in.) | remarks |
|---|---|---|---|
| 21 (21:40) | Phenol-formaldehyde Laminated Asbestos Matte (N.E.M.A. AAA) | very small | very small chips over entire scraping surface |
| 22 (7:05) | Polyphenylene Sulfide-40% Short Glass | very small | slight wire edge, slightly bleached |

Table V — Examples 21-26-Continued

| Example Scraping Time Hrs.:mins. | Blade Material | Blade and Scraping Surface Conditions | |
|---|---|---|---|
| | | Heel width (in.) | remarks |
| 23 (10:15) | Fiber Filled (Ryton R-4) Crystalline Polychloro-trifluoro-ethylene (Kel-F KF 6060) | rough | edge melted, moderate warpage of edge near shaft |
| 24 (17:30) | Polyphenylene Sulfide-40% Short Glass Fiber Filled (Ryton R-4) | very small | slight wire edge, slightly irregular |
| 25 (20:25) | Polyphenylene Sulfide-40% Short Glass Fiber-FIlled (Ryton R-4) | .005–.008 | slight wire edge |
| 26 (30:50) | Polyphenylene Sulfide-40% Short Glass Fiber-Filled (Ryton R-4) | .010–.015 | slight wire edge, flaking |

EXAMPLES 27–55:

In order to make an evaluation of the blades of this invention readily apparent, conditions were changed so that the blades could receive a high load at the scraping edge. These conditions were continued for the remainder of the examples and were as follows: The product was 43° Baume (42 dextrose equivalent) corn syrup containing about 6 percent corn starch. No water was used except that available in the corn syrup, about 20 percent. The number of 6⅛ inches blades was decreased from eight to four putting all the load on 2 linear feet of blade edge. The various blades used had different scraping edge included angles. The jacketed heat exchange cylinder had a 6 inches I.D. and was 24 inches long. The product was heated with 350° F steam. The blades were subjected to the hot product conditions for a number of hours scraping time, while under a low blade edge loading. Then, every 30 minutes, the steam heating jacket held at approximately 350° F was changed from 350° F steam to 46°–73° F water. Within two minutes of this change, the blades which had been weakened by long hours at high temperature were required to scrape off a film of congealed product estimated in the order of one million centipoises (10,000 poises) at 18.8 feet per second velocity. The maximum power and forces involved were held only for about 30 seconds of the 2-minute cooling period and the steam heating was resumed for 28 minutes before the next cooling overload. These conditions caused from 5.0 to 8.8 net horsepower per linear foot to be absorbed at the scraper edge (with tangential force of 141 to 248 pounds per linear foot). An entire useful life of a blade could thereby be expended in a matter of hours so that the blades could quickly be evaluated. The results are tabulated in Table VI:

TABLE VI

Examples 27 – 30

| Example | Blade Material | Scraping Edge Included Angle | Cont. Steam Heating | | Short Cooling Overload Period | | | | Blade and Scraping Edge Conditions | |
|---|---|---|---|---|---|---|---|---|---|---|
| | | | Accumulated Hot Hr:Min | Average Product Temp. °F. | No. of Cooling Overloads | Approx. Wall°F at Hi Load | H.P./Lin. Ft. of Edge at Hi Load | Lbs./Lin. Ft. of Edge at Hi Load | Heel Width (in.) | Remarks |
| 27 | Polyphenylene Sulfide 40% Short Glass Fiber Filled (Ryton R-4) | 60° | 45:55 | 334° | 22 | 52° | 5.0 | 141 | .010 | Moderate number of tiny chips, one 1/16″ D. Chip |
| 28 | Phenol-formaldehyde Laminated Asbestos Matte (N.E.M.A. AAA) | 60° | 6:15 | 334° | 12 | 52° | 5.0 | 141 | — | Very serious flaking ¼-⅜″ wide, Straight, rigid |
| 29 | Phenol-formaldehyde Laminated Cotton Fabric (Synthane-Taylor CB-8/275) | 60° | 6:15 | 334° | 12 | 52° | 5.0 | 141 | — | Badly blistered, first and second layers warped |
| 30 | Polyphenylene Sulfide 40% Short Glass Filled (Ryton R-4) | 60° | 25:45 | 337° | 36 | 52° | 5.1 | 144 | .010 | Tiny edge chips, one 1/16″ D. |

Examples 31 – 35

| 31 | Polyphenylene Sulfide — 40% Short Glass Filled (Ryton R-4) | 90° | 25:45 | | 36 | 52° | 5.1 | 144 | .012 | No chips — good |
| 32 | Polyphenylene Sulfide — 40% Short Glass Filled (Ryton R-4) | 90° | 36:35 | 337° | 55 | 52° | 5.1 | 144 | .015–.020 | Rough—no big chips |
| 33 | Polyphenylene Sulfide — 40% Short Glass Filled (Ryton R-4) | 60° | 36:35 | 337° | 55 | 52° | 5.1 | 144 | .015 | Badly chipped, difficult to measure heel |
| 34 | Phenol-formaldehyde Laminated Asbestos Fabric (Synthane AA-HT) | 15°1/16″ 90° | 2:14 | 338° | 8 | 58° | 6.7 | 189 | — | No difference between edge type or position on shaft. .040 average |

TABLE VI—Continued

Examples 27-30

Heating: Cont. Steam

| Example | Blade Material | Scraping Edge Included Angle | Accumulated Hot Hr:Min | Average Product Temp. °F. | No. of Cooling Overloads | Approx. Wall °F at Hi Load | H.P./Lin. Ft. of Edge at Hi Load | Lbs./Lin. Ft. of Edge at Hi Load | Heel Width (in.) | Remarks |
|---|---|---|---|---|---|---|---|---|---|---|
| 35 | Phenol-formaldehyde Laminated Asbestos Fabric (Synthane AA-HT) | 60° | 2:14 | 338° | 8 | 58° | 6.7 | 189 | — | chipped off heel. Chipping was maximum of about 1/16" at center to minimum of .020 to .030 at ends. This is strongest laminate |

Examples 36 – 40

| Example | Blade Material | Scraping Edge Included Angle | Accumulated Hot Hr:Min | Average Product Temp. °F. | No. of Cooling Overloads | Approx. Wall °F at Hi Load | H.P./Lin. Ft. of Edge at Hi Load | Lbs./Lin. Ft. of Edge at Hi Load | Heel Width (in.) | Remarks |
|---|---|---|---|---|---|---|---|---|---|---|
| 36 | Phenol-formaldehyde Laminated Asbestos Fabric (Synthane AA-HT) | dual 90° | 2:14 | 338° | 8 | 58° | 6.7 | 189 | — | No difference between edge type or position on shaft. .040 average chipped off heel |
| 37 | Phenol-formaldehyde Laminated Asbestos Fabric (Synthane AA-HT) | 45° | 2:14 | 338° | 8 | 58° | 6.7 | 189 | — | Chipping was maximum of about 1/16" at center to minimum of .020 to .030 at ends. This is strongest laminate. |
| 38 | Cast Nylon ¼" thick | 60° | 6:15 | 337° | 12 | 67° | 8.3 | 234 | ⅛" melted | Very bad warpage |
| 39 | Polyphenylene Sulfide 40% Short Glass Fiber Filled (Ryton R-4) | 15° 1/16" 90° | 42:50 | 337° | 68 | 67° | 8.3 | 234 | .012 | Very good condition |
| 40 | Polyphenylene Sulfide 40% Short Glass Fiber Filled (Ryton R-4) | 15° 1/16" 90° | 46:15 | 338° | 80 | 68° | 8.6 | 243 | .020 | Minutely chipped all along edge |

Examples 41 – 45

| Example | Blade Material | Scraping Edge Included Angle | Accumulated Hot Hr:Min | Average Product Temp. °F. | No. of Cooling Overloads | Approx. Wall °F at Hi Load | H.P./Lin. Ft. of Edge at Hi Load | Lbs./Lin. Ft. of Edge at Hi Load | Heel Width (in.) | Remarks |
|---|---|---|---|---|---|---|---|---|---|---|
| 41 | Cast Nylon ¼" thick | 60° | 9:40 | 338° | 25 | 68° | 8.6 | 243 | — | Chipped, entire blade bent at one end |
| 42 | Polyphenylene Sulfide 40% Short Glass Fiber Filled (Ryton R-4) | 15° 1/16" 90° | 53:09 | 336° | 92 | 72° | 8.0 | 225 | .020–.030 | Small chips along edge |
| 43 | Phenol-formaldehyde Asbestos Filled (Celeron 226) | 60 + 90° | 6:54 | 336° | 12 | 72° | 8.0 | 225 | — | Very badly flaked ⅜" back from edge |
| 44 | Phenol-formaldehyde Asbestos Filled (Celeron 226) | 60° | 6:54 | 336° | 12 | 72° | 8.0 | 225 | — | Very badly flaked ⅜" back from edge |
| 45 | Phenol-formaldehyde Laminated Asbestos Fabric (Synthane AAF-HT) | 90° | 4:30 | 332° | 12 | 65° | 8.0 | 225 | .050 | Rough, chips, flakes, badly blistered |

Examples 46 – 49

| Example | Blade Material | Scraping Edge Included Angle | Accumulated Hot Hr:Min | Average Product Temp. °F. | No. of Cooling Overloads | Approx. Wall °F at Hi Load | H.P./Lin. Ft. of Edge at Hi Load | Lbs./Lin. Ft. of Edge at Hi Load | Heel Width (in.) | Remarks |
|---|---|---|---|---|---|---|---|---|---|---|
| 46 | Polyphenylene Sulfide 40% Short Glass Fiber Filled (Ryton R-4) | 90° | 9.25 | 332° | 18 | 65° | 8.0 | 225 | .010 | Excellent |
| 47 | Polyphenylene Sulfide 40% Short Glass Fiber Filled (Ryton R-4) | 90° | 9.25 | 332° | 18 | 65° | 8.0 | 225 | .016 | Excellent |
| 48 | Polyphenylene Sulfide 40% Short Glass Fiber Filled (Ryton R-4) | 90° | 18:43 | 336° | 35 | 61° | 8.8 | 248 | .020 | Excellent |
| 49 | Polyphenylene Sulfide 40% Short Glass Fiber Filled (Ryton R-4) | 90° | 1009:18 | 336° | 17 | 61° | 8.8 | 248 | — | Very minor chipping Very good |

The foregoing tests very substantially show the new and unexpected results obtained with scraper blades constructed in accordance with the features of the present invention.

As the present invention has been described by reference to several embodiments thereof, it will be apparent that numerous other modifications and embodiments will be devised by those skilled in the art which will fall within the true spirit and scope of the present invention.

What is claimed as new and desired to be secured by Letters Patent of the United States is:

1. In a scraped-surface apparatus comprising a fluid container having a substantially cylindrical wall, a rotatable shaft disposed axially thereof defining an annular fluid chamber for holding fluid being treated, and one or more scrapers driven by said shaft extending outwardly thereof and including outer edges for scraping fluid from the inside surface of said cylindrical wall, each scraper defining an acute angle with respect to a tangent drawn at its point of contact with said wall, the improvement wherein each scraper comprises a blade of a polyphenylene sulfide material filled throughout the entire blade with a reinforcing filler, said scraping edge having a substantially perpendicular included angle.

2. The improvement of claim 1 herein said filler is selected from a group consisting of glass fiber, asbestos, mica, polytetrafluoroethylene and fibers of potassium titanate crystals.

3. The improvement of claim 1 wherein said scraper has a second edge useful as a scraping edge having a substantially perpendicular included angle.

4. The improvement of claim 1 wherein said scraper has four edges useful as scraping edges each having a substantially perpendicular included angle.

5. The improvement of claim 1 wherein the material of said blade is substantially uniformly filled with reinforcing filler.

6. The improvement of claim 5 wherein said filler is glass fibers constituting approximately 40 percent dry weight of said material.

* * * * *